1,912,566

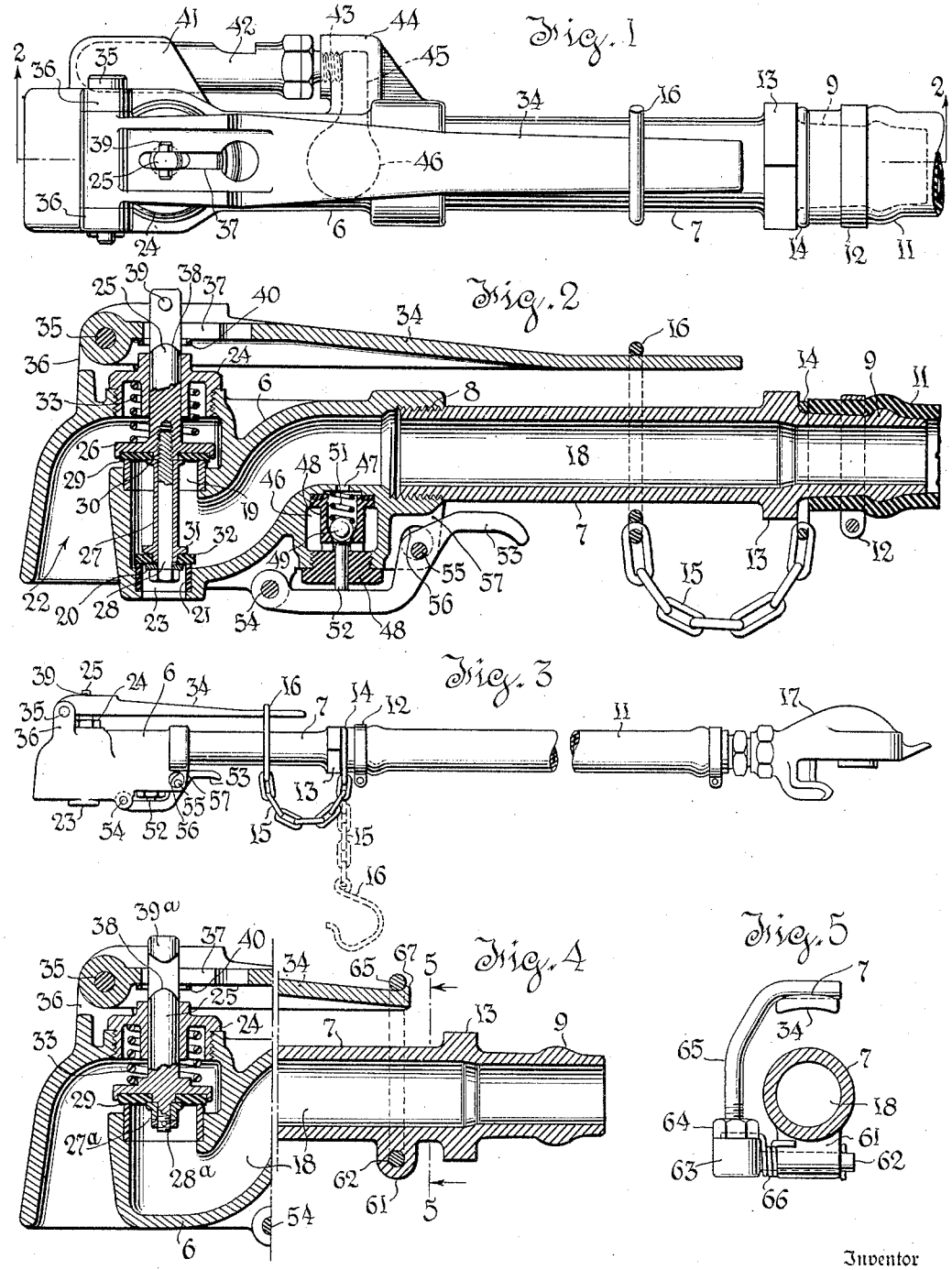
June 6, 1933.  C. A. CAMPBELL  1,912,566
BACK-UP VALVE FOR AIR BRAKE SYSTEMS
Filed June 29, 1931
Inventor
Charles A. Campbell Patented June 6, 1933

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

BACK-UP VALVE FOR AIR BRAKE SYSTEMS

Application filed June 29, 1931. Serial No. 547,762.

This invention relates to air brakes, and particularly to devices known as back-up valves for use by brakemen and conductors on the rear ends of trains while backing.

Such devices customarily include a main venting valve for venting the brake pipe and a warning whistle which is operated by air drawn from the brake pipe, but at a rate so slow as not to produce an application of the brakes. The device is customarily attached to a length of flexible hose terminating in an ordinary brake pipe coupling by means of which the device is placed in communication with the flexible brake pipe hose at the rear end of the rear car.

The present invention produces a light and convenient structure having a number of operative advantages. The vent valve is of the dead man type, that is, the operator has to exert force to hold it closed, so that upon inattention or incapacitation of the operator, the brakes will automatically apply. The valve is of the poppet type, and preferably of the differential or partially balanced variety so that undue force need not be exerted to hold it closed.

Another feature of the invention is the use of a suspending device for the back-up valve which when not in use may be employed to lock the vent valve closed. This is of convenience while attaching the device to the brake pipe hose and while climbing to position on the car. As soon as the operator reaches position he is required to suspend the device by the hook and this restores the dead man action. Since an inspector could readily see whether the suspending device was or was not in use, there is a definite safeguard against the use of the suspending hook to defeat the dead man action while the train is in motion.

When the suspension hook is not needed a somewhat different, self-disengaging catch may be used, and this is illustrated as a modification.

The preferred embodiment of the invention is illustrated in the accompanying drawing, in which Figure 1 is an elevation of the valve device;

Fig. 2 is a longitudinal axial section on the line 2—2 of Fig. 1;

Fig. 3 is an elevation on a reduced scale of the complete device, including the hose and hose connection;

Fig. 4 is a view similar to Fig. 2, but partly broken away, and showing a modification; and Fig. 5 is a section on the line 5—5 of Fig. 4.

The body of the device is composed of two parts, the main portion 6 containing the valve chamber and discharge passage, and an extension 7 threaded to the same at 8. The extension 7 is provided with the usual nipple 9 which receives a length of flexible hose 11. This is fastened by a clamp 12 and the end of the hose 11 is spaced far enough from the collar or boss 13 at the end of the extension 7 to afford space for a ring 14 to which is attached a chain 15 and a specially formed suspending hook 16. This hook may be snapped over the valve actuating handle, bowing the latter slightly. It may be caused to slip off over the end of the handle by springing the handle slightly toward the extension 7.

The opposite end of the hose 11 carries the hose coupling 17 of conventional form adapted to mate with the hose connection on the brake pipe hose of the car. The hose 11 connects the brake pipe to the passage 18 which extends through the members 7 and 6 to the valve seats 19 and 21. The valve seats 19 and 21 are pressed into place and control flow to two discharge ports 22 and 23. These ports are arranged to discharge laterally, and are located on the side opposite the valve-actuating hand lever to minimize the risk of blowing dust into the operator's eyes.

Opposed to seat 19 is the bonnet or cap 24 which is threaded into the body 6 and which is formed with a guide for the stem 25 of the poppet valve structure. This is of the differential partially balanced type and includes a head 26 integral with the stem 25, a tubular member 27 and a machine screw 28 which extends through the tubular member and is threaded into stem 25. The member 27 has a flange 30 at its upper end which serves to retain gasket 29 against head 26, and a flange 31 near its lower end against which a rubber disc valve 32 seats. The valve is retained by a washer 20.

The gasket 29 seals against seat 19 and disc valve 32 seals against seat 21 and is sufficiently flexible to compensate for minor wear on gasket 29, and to permit gasket 29 to unseat in advance of the unseating of disc valve 32. It will be observed that disc valve 32 opens inward and hence is held sealed by brake pipe pressure.

A light spring 33 surrounds stem 25 and reacts between cap 24 and head 26, but is wholly inadequate to resist the opening tendency of the valve under brake pipe pressure arriving through passage 18. The purpose of the spring 33 is merely to seat the valve when the device is not under pressure, and thus automatically position the actuating lever so that it may readily be grasped, or may receive the hook 16 which is snapped over the lever and around the extension 7 as indicated in Figs. 2 and 3.

When the device is in use, that is, when the passage 18 is under pressure, the valve has a decided opening tendency, because of the differential seat areas.

To actuate the valve there is provided a lever 34 which in the valve-closed position extends approximately parallel with the extension 7 and terminates at its free end adjacent the boss 13. The lever 34 is connected by a pivot 35 with a pair of lugs 36 formed on the body portion 6. It is formed with a key-hole slot 37, the narrow portion of which, in the assembled position of the device, straddles a reduced portion of the stem 25. This reduced portion is bounded by a knife edge bearing 38 and a pin 39, and a hardened washer 40 is interposed to take the wear.

To dismount the device it is necessary merely to withdraw the pin 35 and slide the lever 34 endwise far enough to permit the stem to be withdrawn through the circular enlargement at the end of the slot 37.

At one side the body 6 is formed with a pair of spaced flanges 41 intended to shroud and protect a whistle 42 which is threaded at 43 into the boss 44. Formed in the boss 44 is a passage 45 (see Fig. 1) which leads to the whistle valve chamber 46. The whistle valve is of the ball check type and is closed by pressure arriving from the passage 18 through port 47.

The valve seat is formed in a bushing 48, which is threaded into the member 6, and which receives an ordinary ball valve 49 urged in a closing direction by air pressure and by a light spring 51. The valve 49 is forced from its seat by a floating pin 52 when a trigger lever 53 is drawn toward the body 6. This trigger lever is pivoted at 54 and its motion is limited by a pin 55 which works in the round holes 56 formed in the parallel lugs 57 which are cast integrally with the body 6.

To use the device, the operator first attaches the hose coupling 17 to the hose coupling on the end of the brake pipe at the rear of the rear car. He places the hook 16 in position to clamp the lever 34 close to the body 7, that is, in the position in which the valve is closed. He then opens the angle cock at the rear of the train. Since the valve is closed, this will not produce a brake application. He then climbs upon the car, grasps the extension 7 and the lever 34 in one hand, with his index finger on the trigger lever 53, removes the hook 16 and hangs it upon a grab iron or platform rail. He is then ready to assume backing control of the train.

To sound a warning signal the operator presses the lever 53 with the index finger. To make an application of the brake he relaxes his grasp upon the extension 7 and lever 34, allowing the valve to be unseated by brake pipe pressure. The venting of the brake pipe thus produced is sufficient to cause an application of the brakes, whose intensity is determined by the amount of air vented and the rate at which it is vented.

Should the operator lose his grasp on the device for any cause, the valve will be opened wide and the rapid venting of the brake pipe will produce an emergency application.

Under all ordinary conditions the valve will unseat readily, but should it stick to its seat, it can be unseated by drawing the lever 34 away from the extension 7. The failure of the valve to unseat is not expected to occur, but the possibility of forcibly opening this valve is an important feature from the standpoint of absolute safety.

The shrouding and protection of the whistle is an important feature in a device of this character because of the hard service which it customarily receives.

While I prefer to locate the lever 34 and the trigger lever 53 on diametrically opposite sides of the device because this facilitates operation of the whistle valve by the index finger, the trigger lever may be variously located relatively to the lever 34, the important feature being that it shall be capable of operation by a digit of that hand which clasps the lever 34 and extension 7.

While the extension 7 is shown as a separate part from the body 6, this is merely for convenience in manufacture, and it is in effect an element of the valve body.

Various other structural changes may be made without departing from the spirit of the invention, certain of which will be described.

As indicated in Fig. 4 the valve seat 21, port 23 and valve disc 32 may be omitted. In such case a threaded lug 28ᵃ may take the place of screw 28 and gasket 29 may be retained by nut 27ª threaded onto lug 28ª and pinned as indicated. Here the valve is a single-beat poppet valve and is totally unbalanced. Hence it has a strong opening tendency. With high brake pipe pressure the opening tendency is unnecessarily great. In such case the partially balanced valve is preferred. The pin 39 is omitted from stem 25, and instead, the stem is formed with a head portion 39ª having a knife edge bearing opposed to that shown at 38.

As indicated in Figs. 4 and 5 a different retainer for lever 34 may be used where it is not desired to combine this detail with the suspending hook.

A lug 61 is formed on extension 7 and in this is swiveled a shaft 62 having a head 63. Threaded onto head 63 and locked therein by a nut 64 is a hook 65 which in one position overhangs the end of lever 34, and in another position clears the lever 34. A torsion spring 66 tends to swing the hook 65 clear of lever 34. There is a retaining rib 67 across the end of lever 34, and the lever is sprung slightly to engage and release the hook. The hook disengages automatically when the lever is sprung inward. Thus both the retaining means have in common the feature of releasing or moving clear of the end of the handle when the latter is sprung.

What is claimed is:

1. A dead man's back-up valve for air brakes, comprising a body; means controlling venting of said body and having an opening tendency, said means and the body being adapted to be grasped in the hand of an operator to hold said vent controlling means closed; and a signal valve operable independently by a digit of the same hand while the body and controlling means are so grasped.

2. A dead man's back-up valve for air brakes, comprising a body; means controlling venting of said body and having an opening tendency, said means and the body being adapted to be grasped in the hand of an operator to hold said vent controlling means closed; a signal valve operable independently by a digit of the same hand while the body and controlling means are so grasped; and means operable alternatively to support said body, or to clamp said body and vent controlling means in vent closing relation.

3. In a back-up valve device, the combination of a body having a brake pipe connection and a brake pipe discharge passage; a discharge valve controlling said passage and having an opening tendency at least when the device is in use; an air operated warning signal; a signal valve controlling flow to said signal; a grip structure including a part associated with said body and a part associated with said discharge valve, and adapted to be grasped in the operator's hand to hold the discharge valve closed; and means operable by a digit of the same hand while grasping said grip structure to actuate said signal valve.

4. In a back-up valve device, the combination of a body having a brake pipe connection and a brake pipe discharge passage; a discharge valve controlling said passage and having an opening tendency at least when the device is in use; an air operated warning signal; a signal valve controlling flow to said signal; a grip structure including a part associated with said body and a part associated with said discharge valve, and adapted to be grasped in the operator's hand to hold the discharge valve closed; means operable by a digit of the same hand while grasping said grip structure to actuate said signal valve; and suspending means for said body operable when not in use to engage said grip structure and hold said discharge valve closed.

5. In a back-up valve, the combination of a body having a brake pipe connection and a brake pipe discharge passage; a poppet valve opening in the direction of discharge flow and controlling said discharge passage; an air actuated warning signal; a valve controlling air flow to said signal; and levers pivotally mounted on opposite sides of said body, one lever being adapted to be grasped together with said body, in an operator's hand, to hold said poppet valve closed, and the other adapted to be actuated simultaneously by a digit of the same hand.

6. In a back-up valve, the combination of a body having a brake pipe connection; a discharge controlling poppet valve unit made up of two connected valve elements, one opening inward and the other outward; means for biasing said valve unit in an opening direction; and means for holding said poppet valve unit closed, said means comprising a member mechanically related to said valve unit and body and adapted to be grasped with the body in the hand of the operator.

7. The structure defined in claim 6 further characterized in that the inward opening valve element is flexible.

8. The structure defined in claim 6 further characterized in that the outward opening valve element is larger than the inward opening valve element.

9. The structure defined in claim 6 further characterized in that the outward opening valve element is larger than the inward opening element, and in that there is a spring urging the valve unit closed, said spring being insufficient in strength to prevent the opening of the valve when under pressure.

10. In a back-up valve, the combination of a slender elongated body having a brake pipe connection and a brake pipe discharge passage; a poppet valve opening in the direction of discharge flow and controlling said discharge passage; an air actuated warning signal; a valve controlling air flow to said signal; a relatively long lever pivoted to said body and extending substantially parallel thereto, said lever engaging said discharge valve and serving when grasped together with said body in the hand of an operator, to hold said discharge valve closed; and a trigger-like member for actuating said signal valve, arranged to be actuated by a digit of the same hand while grasping said first lever and body.

11. The combination defined in claim 10 further characterized in that there is two-way engagement between said lever and discharge valve, whereby the lever may be manipulated to unseat forcibly the discharge valve.

12. In a back-up valve device, the combination of a body having a brake pipe connection and a brake pipe discharge passage; a discharge valve controlling said passage and having an opening tendency, at least when the device is in use; and a grip structure including a part associated with said body and a part associated with said discharge valve, and adapted to be grasped in the operator's hand to hold said discharge valve closed.

13. In a back-up valve device, the combination of a body having a brake pipe connection and a brake pipe discharge passage; a discharge valve controlling said passage and having an opening tendency, at least when the device is in use; a grip structure including a part associated with said body and a part associated with said discharge valve, and adapted to be grasped in the operator's hand to hold said discharge valve closed; and suspending means for said body operable, when not in use, to engage said grip structure and hold said discharge valve closed.

14. In a back-up valve device, the combination of a body having a brake pipe connection and a brake pipe discharge passage; a discharge valve controlling said passage and having an opening tendency, at least when the device is in use; a grip structure including a part associated with said body and a part associated with said discharge valve, and adapted to be grasped in the operator's hand to hold said discharge valve closed; and means adjustable to react between the two parts of said grip structure to hold said discharge valve closed, said means being retained in operative position by the resilience of at least one of said parts, and being releasable by forcing said parts toward one another.

15. The combination with a brake pipe of a fluid pressure brake system, of a back-up device comprising a valve for controlling the venting of fluid from the brake pipe to effect an application of the brakes, a manually controlled lever for holding said valve closed, the valve being opened upon release of the lever, and a manually controlled member acting on said lever to prevent the opening of said valve upon release of said lever.

16. The combination with a brake pipe of a fluid pressure brake system, of a back-up device comprising a valve subject to brake pipe pressure tending to open the valve for controlling the venting of fluid from the brake pipe to effect an application of the brakes, a manually controlled lever for holding said valve closed, and a manually controlled member acting on said lever to prevent the opening of the valve upon release of the lever.

17. The combination with a brake pipe of a fluid pressure brake system, of a back-up device comprising a valve for controlling the venting of fluid from the brake pipe to effect an application of the brakes, a manually controlled lever for holding said valve closed, the valve being opened upon release of the lever, a manually controlled member acting on said lever to prevent the opening of said valve upon release of said lever, and yielding means urging the last named member to an inactive position.

18. The combination with a brake pipe of a fluid pressure brake system, of a back-up device comprising a valve subject to brake pipe pressure tending to open the valve for controlling the venting of fluid from the brake pipe to effect an application of the brakes, a manually controlled lever for holding said valve closed, a manually controlled member acting on said lever to prevent the opening of the valve upon release of the lever, and yielding means urging the last named member to an inactive position.

19. In a back-up valve device the combination of a body having a brake pipe connection and a brake pipe discharge passage; a discharge valve controlling said passage and having an opening tendency at least when the device is in use; a grip structure including a part associated with said body, and a part associated with said discharge valve and adapted to be grasped in the operator's hand to hold said discharge valve closed; and means for retaining said discharge valve closed, comprising a latch member capable of reacting between the parts of said grip structure, means urging said latch member in a disengaging direction, and a detent for holding said latch in its engaged position, said detent being releasable by flexure of one of said grip members.

In testimony whereof I have signed my name to this specification.

CHARLES A. CAMPBELL.